May 16, 1967 R. A. KENKEL 3,319,731
COMBINED CLUTCH AND BRAKE CONTROL FOR TRACTORS
Original Filed Oct. 29, 1962 4 Sheets-Sheet 1
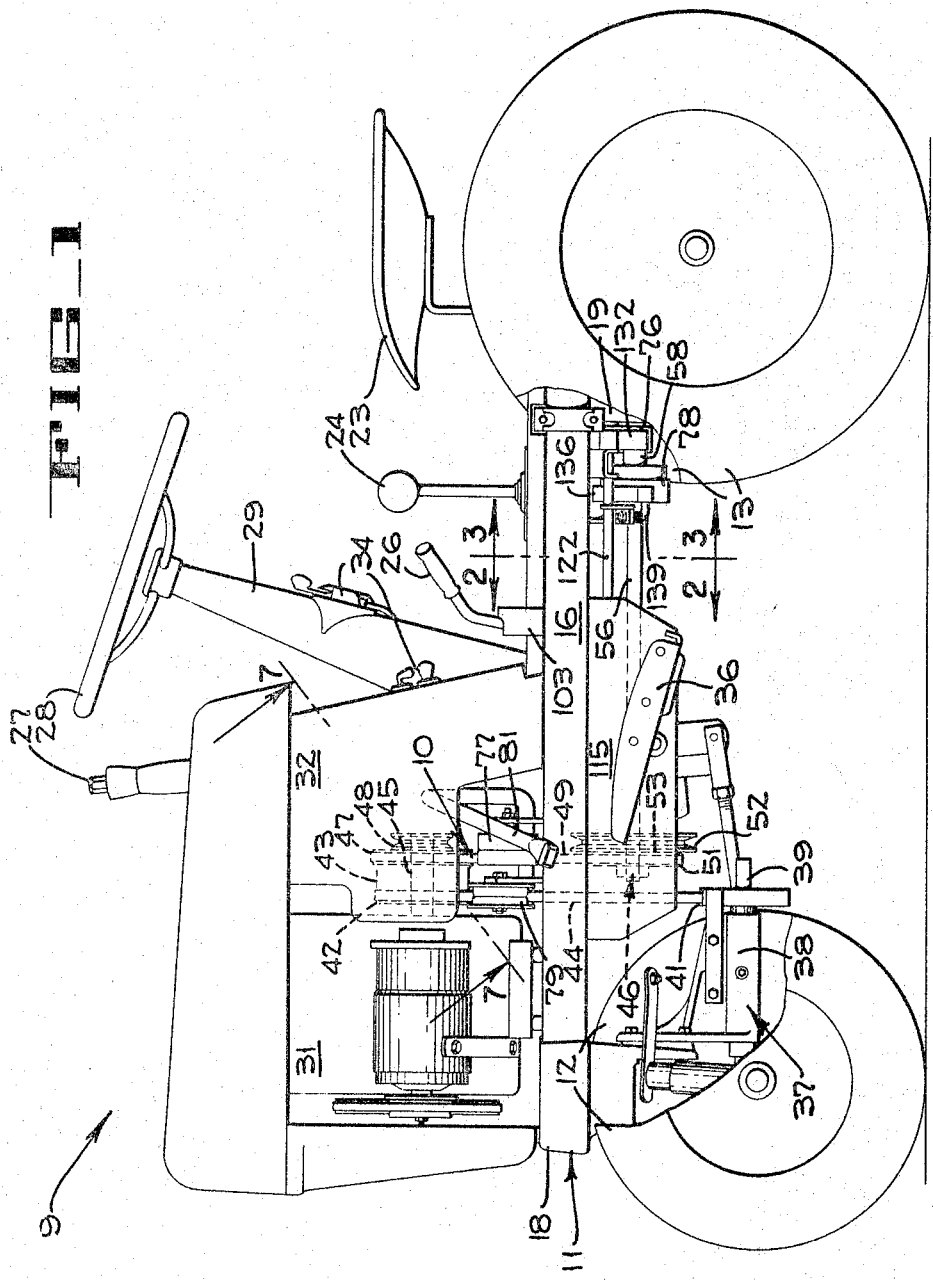
INVENTOR
ROBERT A. KENKEL
BY *Hans G. Hoffmeister*
ATTORNEY

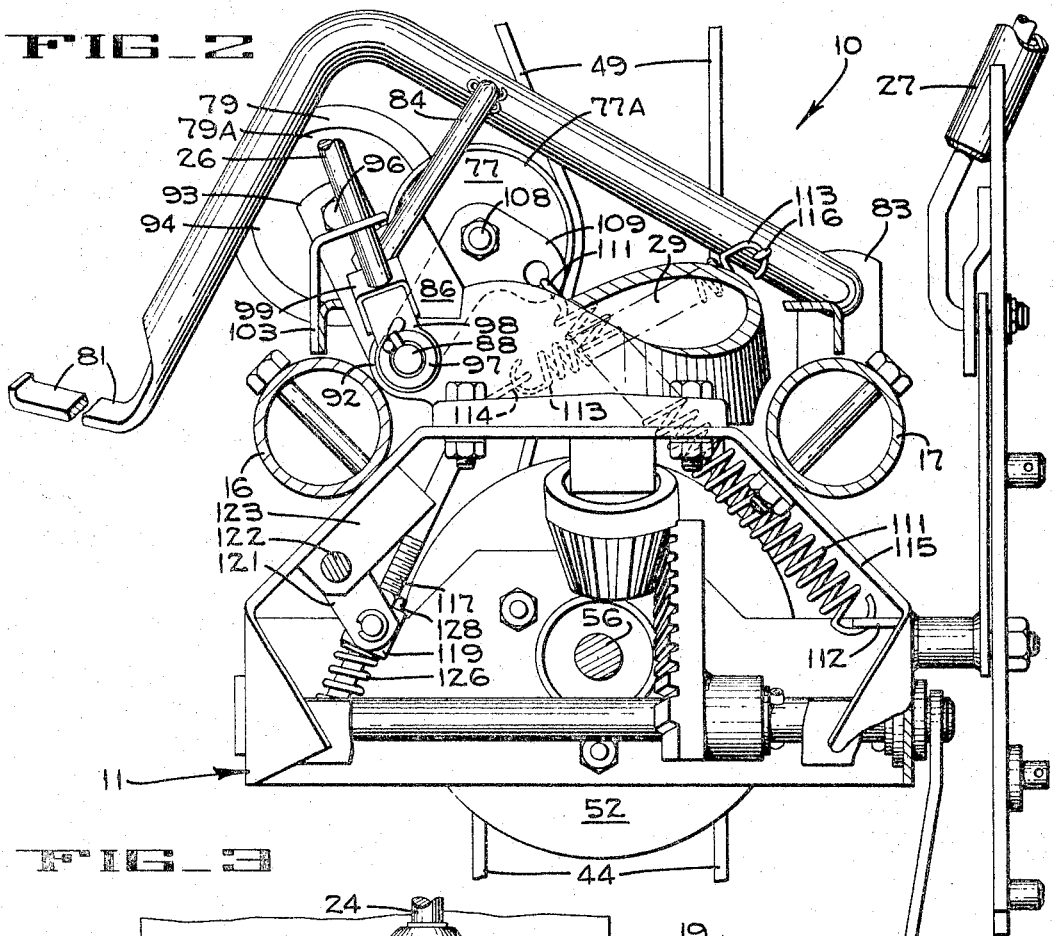
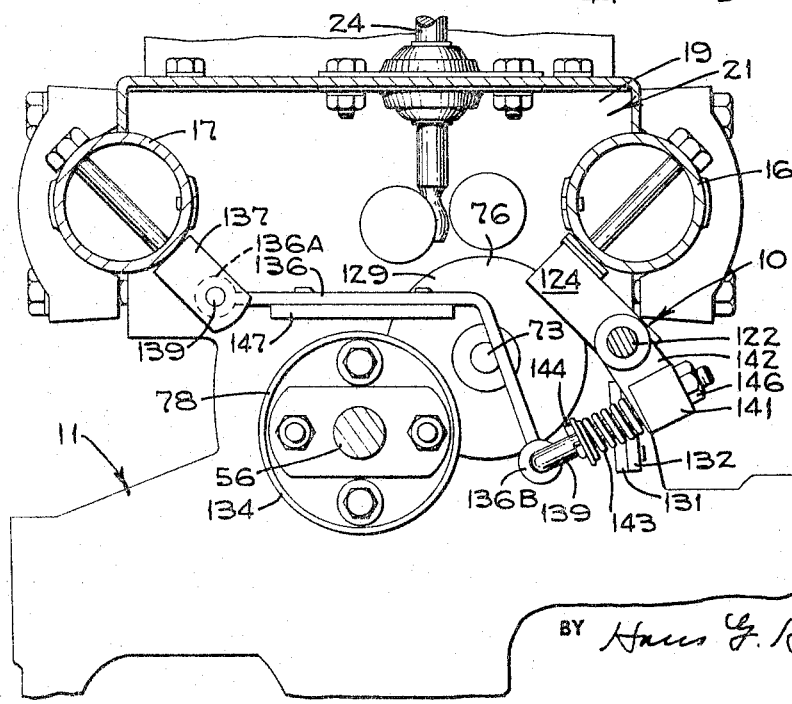

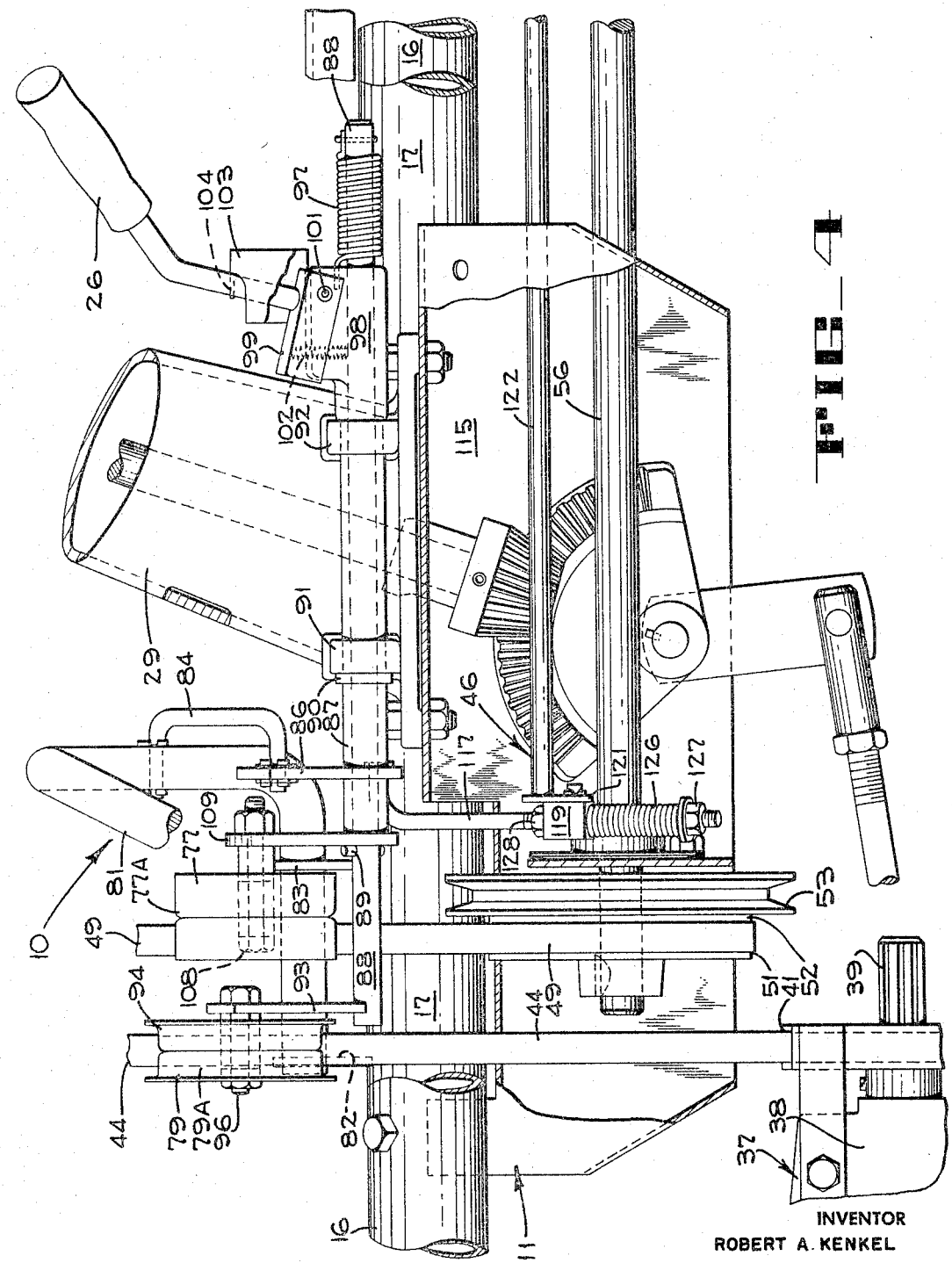

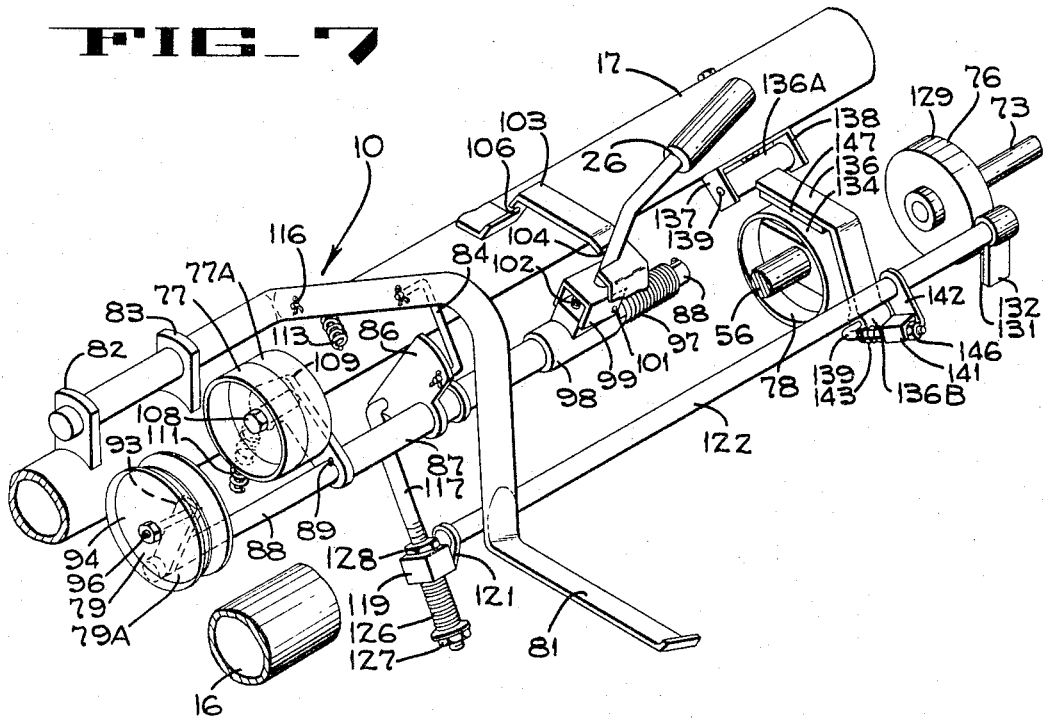
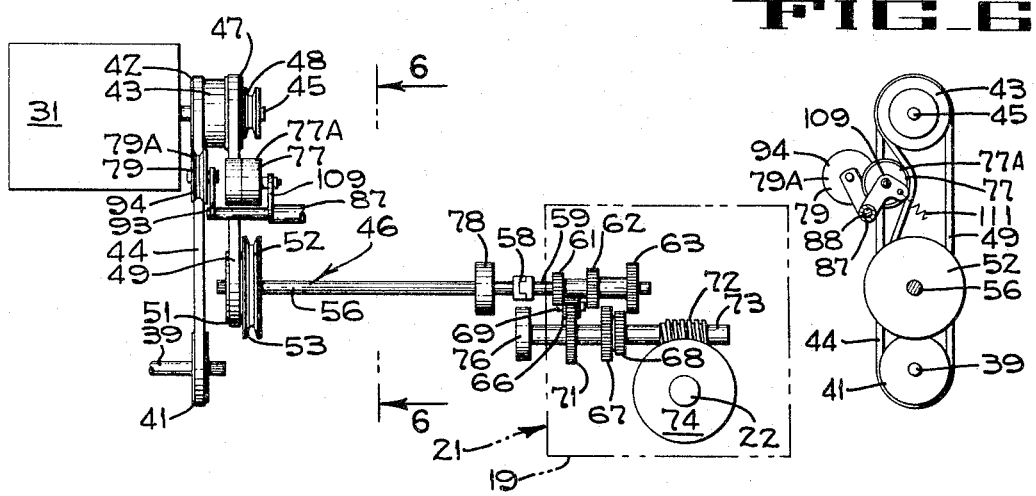

United States Patent Office 3,319,731
Patented May 16, 1967

3,319,731
COMBINED CLUTCH AND BRAKE CONTROL
FOR TRACTORS
Robert A. Kenkel, South Bend, Ind., assignor to FMC
Corporation, San Jose, Calif., a corporation of Delaware
Continuation of application Ser. No. 233,743, Oct. 29,
1962. This application Apr. 2, 1965, Ser. No. 446,786
11 Claims. (Cl. 180—53)

This application is a continuation of my earlier filed application, Ser. No. 233,743, filed Oct. 29, 1962, and since abandoned.

The present invention pertains to tractors, and more particularly relates to a mechanism for controlling the drive train of a tractor.

Light duty tractors of the type commonly used to operate power lawn mowers and tillers, or the like, are usually provided with transmissions which may be shifted into several speed ranges. Heretofore, however, these tractors could not be brought to an immediate stop, could not be shifted immediately after disengaging the clutch, and could not be shifted while moving. Accordingly, it is an object of the present invention to provide a tractor drive train that is not subject to the above-mentioned deficiencies.

Another object of the present invention is to provide an improved power train control mechanism.

Another object is to provide a tractor control mechanism having a braking system included therein that is capable of immediately stopping the tractor.

Another object is to provide a power train control mechanism having a single pedal for operating both the drive clutch and the braking systems.

Another object is to provide a power train control mechanism arranged to permit shifting from one gear to another gear while the tractor is in motion.

Another object is to provide a power train control mechanism arranged to permit immediate shifting upon disengagement of a normally engaged transmission clutch.

These and other objects and advantages of the present invention will become apparent from the following description and the accompanying drawings, in which:

FIGURE 1 is a side elevation of a tractor embodying the improved power train control mechanism of the present invention, certain parts being broken away.

FIGURE 2 is an enlarged section taken along lines 2—2 of FIGURE 1.

FIGURE 3 is an enlarged vertical section taken along lines 3—3 of FIGURE 1 and illustrating a braking system of the drive train control mechanism.

FIGURE 4 is an enlarged side elevation of a portion of the machine of FIGURE 1, certain parts being broken away to more clearly illustrate parts of the control mechanism.

FIGURE 5 is a diagrammatic elevation of the drive train of the tractor shown in FIGURE 1.

FIGURE 6 is a diagrammatic vertical section taken along lines 6—6 of FIGURE 5.

FIGURE 7 is an enlarged perspective of the power train control mechanism, the view having been taken looking in the direction of the arrows 7—7 in FIGURE 1.

The tractor 9 (FIG. 1), with which the power train control mechanism 10 of the present invention is associated, comprises a frame 11 which is supported on two steerable wheels 12 at the front of the tractor and two drive wheels 13 at the rear of the tractor. The frame 11 includes a pair of parallel, longitudinally extending tubes 16 and 17 (FIG. 2) which are connected at their forward ends to a front axle support bracket 18 (FIG. 1) and at their rear ends to the housing 19 of a combined transmission-differential unit 21. The transmission-differential unit 21 includes a rear axle 22 to which the drive wheels 13 are connected in driving engagement.

A driver's seat 23 is bolted to the frame 11 so that an operator on the seat is within easy reach of a gear shift lever 24, a power take-off control lever 26, an implement control lever 27, and a steering wheel 28. The steering wheel 28 is connected to the steerable wheels 12 in any well known manner to steer the same, and is supported in an inclined position by a generally frusto-conical housing 29.

An engine 31 is mounted on the forward end of the frame 11 and is partially enclosed in an engine housing 32. The usual engine controls 34 are mounted on the rear surface of the engine housing 32 and on the rear surface of the frusto-conical housing 29. Foot rests 36 (only one being shown in FIG. 1) are mounted on opposite sides of the tractor for the convenience of the operator.

The tractor 9 includes a power take-off assembly 37 which comprises a housing 38 supported from the frame 11 with a power take-off shaft 39 journalled therein and projecting outwardly from both ends thereof. Both ends of the shaft 39 are splined for connection to power driven implements (not shown). A pulley 41 (FIG. 1 and 4) is secured to the shaft 39 near its rear end and is connected in driven relation to one groove 42 (FIGS. 1 and 5) of a three groove drive pulley 43 by a V-belt 44. The drive pulley is keyed to the output shaft 45 of the engine 31.

In the preferred embodiment the power train 46 connected to the drive wheels 13, is controlled by the mechanism 10 of the present invention and receives power from the drive pulley 43. A V-belt 49 is arranged to be disposed in either the large diameter groove 47 of pulley 43 and a small diameter groove 51 of a driven pulley 52, or in a small diameter groove 48 of pulley 43 and a large diameter groove 53 in the driven pulley 52, whereby the tractor may be driven either in a high speed range or a low speed range.

The driven pulley 52 is keyed on one end of a main drive shaft 56 which is journalled in the frame 11 of the machine and is connected by a flexible coupling 58 to a splined input shaft 59 of the transmission-differential unit 21, which input shaft 59 will be considered as a portion of the main drive shaft 56.

The transmission-differential unit 21 may be of any suitable well known type controlled by the external gear shift lever 24. Accordingly, only a brief description of the unit 21 will follow.

A reverse gear 61 (FIG. 5), a slow speed gear 62, and a high speed gear 63 are slidably mounted on a splined portion of the input shaft 59 and may be shifted into meshing engagement with cooperating gears 66, 67 and 68, respectively, upon selective movement of the gear shift lever 24. The gear 66 is an idler gear which is journalled on a stub shaft 69 and is in mesh with a large diameter gear 71 to provide means for driving the gear train in reverse. The gears 67, 68, 71 and a worm 72 are keyed to a worm gear shaft 73 which is journalled in the housing 19 of the transmission-differential unit 21. It will be understood that each of the gears 61, 62 and 63 is shifted independently of the others, by selective control of the gear shift lever 24, into meshing engagement with its associated gear. The worm 72 meshes with a worm gear 74 which is connected in driving engagement to the rear axle 22 to which the drive wheels 13 are secured.

As is well known in the art, a worm gear drive of the above described type is a non-reversible drive, that is, the worm 72 can act as a driver to drive the worm gear 74 but the worm gear 74 cannot act as a driver to drive the worm 72. It has been discovered however, that the inertia in the power train 46 of a tractor is sufficient to continue the rotation of worm gear 72 and permit the tractor to coast a considerable distance after the power is disconnected from the main drive shaft 56. Accordingly, a worm gear shaft brake 76 has been provided for immediately stopping the tractor 9.

As will be described hereinafter, the main drive shaft 56 is normally connected to the output shaft 45 of the engine 31 as seen in FIGURE 6 by a clutch means, such as, a drive belt tightener 77, in the form of a pulley 77A and the drive belt 49 with which the pulley is arranged to be engaged by an actuating mechanism, to be described presently. It should be noted that although the embodiment shown uses a belt tightener and a drive belt as the clutch means, other well known clutch means for connecting two rotary shafts would suffice as, for example, a disc type clutch joining shaft 56 and a coaxial shaft on which driven pulley 52 would be keyed. It will be evident, therefore, that the drive shaft 56 will tend to continue rotating, due to the momentum of the system, when disconnected from the engine thereby preventing immediate shifting of the gears 61, 62 or 63. Accordingly, a main drive shaft brake 78 has been provided as means for immediately stopping the rotation of the main drive shaft 56 so that the gears may be immediately shifted after disengagement of the drive belt tightener 77.

The brakes 76 and 78, the drive belt tightener 77, and a power take-off belt tightener 79 (FIG. 4) are included in the power train control mechanism 10 best shown in FIGURES 2, 3, 4 and 7. The power take-off belt tightener 79 is similar to the drive belt tightener 77 in that it is in the form of a pulley 79A (FIG. 4) that is movable to and from engagement with the belt 44. The two brakes and the drive belt tightener 77 are operated by a common pedal 81, however, the power take-off belt tightener 79 is operated independently of pedal 81. The pedal 81 is journalled on ears 82 and 83 (FIG. 7) projecting upwardly from the tube 17 and is pivotally connected by a link 84 to one end of an arm 86 which is welded to a sleeve 87. The sleeve 87 is journalled on a power take-off tightener shaft 88 (FIGS. 4 and 7) and is held from axial movement relative thereto by a collar 90 and by a pin 89 which is secured to the shaft 88 and engages one end of the sleeve. The collar 90 is secured to the sleeve 87 and engages one of two ears 91 and 92 projecting outwardly from the frusto-conical housing 29. The sleeve 87 is journalled in the ears 91 and 92.

One end of a crank arm 93 is welded to the forward end of the shaft 88, and a power take-off belt tightening idler 94 is journalled on a shoulder bolt 96 which is secured to the free end of the crank arm 93. A torsion spring 97 (FIG. 4) is connected between the rear end of the power take-off belt tightener shaft 88 and a shift block 98 which is journalled on the shaft 88 and bears against the ear 92 to prevent axial movement of the shaft 88.

The lower end of the power take-off control lever 26 is welded to a U-shaped bracket 99 which is pivotally connected by a pin 101 to the shift block 98 so as to permit the upper end of the control lever 26 to be moved a short distance in a direction parallel to the shaft 88. The connection is such that transverse movement of the upper end of the control lever 26 will cause the shift block 98 to pivot about the axis of the shaft 88 and thus rotate the shaft 88 through the torsion spring 97. A compression spring 102 is disposed between the block 98 and the U-shaped bracket 99 and urges the lever 26 rearwardly as indicated in FIGURE 4. It will be noted that, when the shaft 88 is rotated due to actuation of the control lever 26, the power take-off lever idler 94 will swing about the axis of shaft 88 to engage or disengage the clutch or belt tightener 79.

A positioning bracket 103 (FIG. 7) for the power take-off belt tightener 79 is secured to the frame 11 and extends transversely of the shaft 88 adjacent the control lever 26. A positioning bracket 103 is provided with a notch 104 for receiving the control lever and holding the shaft 88 in a predetermined angular position such that the take-off idler 94 of clutch 79 at the opposite end of shaft 88 is in a disengaged position spaced from the power take-off belt 44. A second notch 106 is provided in the bracket 103 for receiving and locking the control lever 26 in an engaged position wherein the idler 94 holds the V-belt 44 in driving engagement with the drive pulley 43 and with the pulley 41 of the power take-off assembly 37 as seen in FIGURE 6. Since the actuation or release of the power take-off belt tightener 79 is controlled by lever 26, acting through the torsion spring 97, it will be apparent that these operations are performed independently of the pedal 81.

The pedal 81 acts as a common control for the brakes 76 and 78, and for the drive clutch 77. As will be explained presently, when the pedal 81 is depressed partway, the brake 78 is applied and the drive belt tightener 77 is released but the brake 76 is not applied until the pedal is fully depressed. The drive belt tightener pulley 77A is journalled on a shouldered bolt 108 which is secured to the free end of a bell crank 109 welded to the sleeve 87. The pulley 77A is normally held in resilient engagement with the belt 49 by a spring 111 (FIG. 2) which is connected between the bell crank 109 and a clip 112 formed on a housing 115 that is supported from the tubes 16 and 17 of the frame. A relatively light spring 113 is connected in opposition to the spring 111 between a clip 114 bolted to the frame and a pin 116 connected to the pedal 81 adjacent its pivotal axis. The spring 113 tends to minimize any tendency for the different parts of the control mechanism 10 to rattle.

The brakes 76 and 78 (FIG. 7) are controlled by a link 117 which is pivotally connected to the free end of the arm 86 and is slidably received in a pivot block 119. The pivot block 119 is pivotally connected to one end of a lever 121 which is welded to a brake shaft 122. The brake shaft 122 is journalled in a bracket 123 (FIG. 2) projecting inwardly from housing 115 and in a bracket 124 that is bolted to the tube 16 of the frame 11. A compression spring 126 is wound around the lower end portion of the link 117 and is disposed between the pivot block 119 and a lock nut 127 screwed on the lower end of the link 117. A lock nut 128 is screwed on the shaft above the pivot block 119 and serves to limit the amount of upward movement of the pivot block relative to the link 117.

The brake 76 (FIGS. 3 and 7) on the worm gear shaft 73 comprises a brake drum 129 secured to the shaft 73 and a brake shoe 131 that is connected to a lever 132 rigidly secured to the brake shaft 122. It will be noted that downward movement of the free end of the pedal 81 will cause the spring 126 to rotate the brake shaft 122 in a clockwise direction (FIG. 7) to resiliently engage the brake shoe 131 with the brake drum 129 thereby stopping the worm gear shaft 73 and, accordingly, the tractor 9.

The main drive shaft brake 78 comprises a brake drum 134 which is rigidly secured to the main drive shaft 56. A brake shoe 136 is provided with a tubular end portion 136A that is rotatably journalled on a pin 139 which is carried by ears 137 and 138 secured to and projecting outwardly from the tube 17, as clearly shown in FIGURE 7. The other end 136B of the shoe 136 is pivotally connected to a link 139 (FIG. 3) which is slidably received in a pivot block 141 that is pivotally connected to a lever 142 rigidly secured to the brake shaft 122. A compression spring 143 is wound around the link 139 and is disposed between the adjacent face of the pivot block 141 and a pin 144 secured to the link. A stop nut 146 screwed on the free end of the link 139 limits the amount of outward movement of the pivot block 141. A brake pad 147 of the brake shoe 136 is in position to engage the brake drum 134 in the usual manner.

As mentioned previously, full depression of the pedal 81 will cause the link 117 to move upwardly (FIG. 7) thereby causing the shaft 122 to be rotated in a clockwise direction under the influence of the spring 126. This rotation of the shaft 122 will exert a resilient force against the spring 143 which, in turn, will exert a resilient force against the brake shoe 136. The brake shoe 136 will then move downwardly causing the brake pad 147 to firmly engage the brake drum 134 thereby stopping the main drive shaft 56 and permitting immediate shifting of the gears in the transmission-differential unit 21.

In the operation of the tractor 9, having the power train control mechanism 10 of the present invention therein, the operator first starts the engine 31 in the usual manner when the transmission is in neutral. He then partially depresses the pedal 81 thereby releasing the drive belt tightener 77 and engaging the brake 78. Engagement of the brake 78 stops the main drive shaft 56 and permits the operator to immediately shift to any gear desired by means of gear shift lever 24. The operator then releases the pedal 81 to first release the brake 78 and thereafter effect engagement of the drive belt tightener 77. The tractor then begins to move in whichever direction the operator has selected. If the operator has placed the transmission-differential unit 21 in the low speed range and wishes to shift to the high speed range, the operator merely depresses the pedal 81 part way thereby releasing the drive belt tightener 77 and applying the brake 78 which stops the shaft 56 and permits shifting to a higher speed gear while the tractor is in motion. It will be appreciated that this partial downward movement of the pedal 81 does not engage the brake 76 and accordingly does not apply a braking force resisting the forward movement of the tractor.

If the operator should have reason to stop the tractor immediately while driving in either a forward or reverse direction, the operator merely fully depresses the pedal 81 thereby releasing the drive belt tightener 77 and fully engaging both the brake 78 and the brake 76. Engagement of the brake 76 will stop the worm gear shaft 73 thereby immediately stopping the tractor. The spring 143 associated with brake 78 will permit further rotation of the shaft 122 after the brake 78 has been applied.

The power take-off belt tightener 79 which connects the power take-off shaft 39 to engine shaft 45, can be engaged or disengaged, independently of the position of the pedal 81 and whether or not the tractor 9 is moving, by merely moving the power take-off control lever 26 forward out of one of the locking notches 104 or 106 and then shifting the lever 26 transversely and releasing it in the other one of said notches. With this arrangement the tractor 9 need not be stopped in order to connect or disconnect the power take-off shaft 39 from its source of power.

From the foregoing description it will be apparent that the power train control mechanism 10 of the present invention includes a single pedal 81 for controlling the power train 46 to the drive wheels 13. The arrangement is such that the pedal 81 is normally held in elevated position and the drive belt tightener 77 is held in driving engagement, by spring 111. Full downward movement of the free end of the pedal actuates the brakes 76 and 78 to stop the main drive shaft 56 to permit immediate shifting, and to stop the worm gear shaft 73 which stops the movement of the tractor. Partial downward movement of the pedal first disengages the drive belt tightener 77 and shortly thereafter engages the brake 78 to permit shifting to a higher or lower gear while the tractor is in motion.

While one embodiment of the present invention has been shown and described, it will be understood that various changes and modifications may be made without departing from the spirit of the invention or the scope of the appended claims.

Having thus described the present invention, what is claimed as new and desired to be protected by Letters Patent is:

1. In a tractor having a power train which includes an engine, a main drive shaft having a plurality of shiftable gears thereon, a drive belt connecting said engine to said main drive shaft, a belt tightener operatively connected to said belt to tighten said belt or to loosen it, a worm shaft having a plurality of driven gears thereon, means for shifting a selected one of said shiftable gears into engagement with a predetermined one of said driven gears, ground engaging drive wheels, and means connecting said drive wheels to said worm shaft; the improvement which comprises first brake means operatively connected to said main drive shaft, second brake means operatively connected to said worm shaft, and a single pedal connected to said belt tightener and to both of said brake means and arranged upon being actuated to first release said belt tightener and thereafter activate said first brake means, and then activate said second brake means.

2. In a tractor having a power train which includes an engine, a main drive shaft having a plurality of shiftable gears thereon, a drive belt connecting said engine to said main drive shaft, a belt tightener operatively connected to said belt to tighten or loosen said belt, a worm shaft having a plurality of driven gears thereon, means for shifting a selected one of said shiftable gears into engagement with a predetermined one of said driven gears, ground engaging drive wheels, and means connecting said drive wheels to said worm shaft; the improvement which comprises a first brake drum secured to said main drive shaft, a second brake drum secured to said worm shaft, a first brake shoe mounted for movement into braking engagement with said first brake, a second brake shoe mounted for movement into engagement with said second brake shoe, and movable means connected to both of said brake shoes and to said belt tightener and arranged upon movement out of a normal belt tightening position to first release said belt, to thereafter actuate said first brake shoe into braking engagement with said first brake drum, and then to move said second brake shoe into braking engagement with said second brake drum.

3. In a tractor having a power train which includes an engine, a main drive shaft having a plurality of shiftable gears thereon, a drive belt connecting said engine to said main drive shaft, a belt tightener adapted to tighten or loosen said drive belt, a worm shaft having a plurality of driven gears thereon, means for shifting a selected one of said shiftable gears into engagement with a predetermined one of said driven gears, ground engaging drive wheels, and means connecting said drive wheels to said worm shaft; the improvement which comprises a first brake drum secured to said main drive shaft, a second brake drum secured to said worm shaft, a pivotally mounted pedal, first connecting means pivotally connecting said pedal to said belt tightener, resilient means for normally holding said belt tightener in tightening position and for holding said pedal in its uppermost position, a first pivotally mounted brake shoe movable between a released position spaced from said first brake drum and an actuated position in engagement with said first brake drum, second connecting means resiliently connecting said first brake shoe to said first connecting means with said first brake means being in a released position when said pedal is in its uppermost position, a second pivotally mounted brake shoe movable between a released position spaced from said second brake drum and an actuated position in engagement with said first brake drum, third connecting means connecting said second brake shoe to said second connecting means with said second brake means being in a released position when said pedal is in its uppermost position, said connecting means being so arranged that initial downward movement of said pedal releases said belt tightener, further movement of said pedal engages said first brake shoe with said first brake drum and still further downward movement of said pedal engages said second brake shoe with said second brake drum.

4. In a tractor having a power train which includes an engine, a main drive shaft having a plurality of shiftable gears thereon, a drive belt engaging said engine with said main drive shaft, a drive belt tightener adapted to tighten said belt or to release said belt alternately, a worm shaft having a plurality of driven gears thereon, means for shifting a selected one of said shiftable gears into engagement with a predetermined one of said driven gears, ground engaging drive wheels, means connecting said drive wheels to said worm shaft, a power take-off shaft, and a power take-off belt tightener movable between a belt tightening position connecting said engine in driving engagement with said power take-off shaft and a belt loosening position releasing said engine from said power take-off shaft; the improvement which comprises a first brake drum secured to said main drive shaft, a second brake drum secured to said worm shaft, a pivotally mounted pedal, first connecting means pivotally connecting said pedal to said drive belt tightener and including a sleeve journalled for rotation about a fixed axis, resilient means for normally holding said belt tightener in belt tightening position and for holding said pedal in its uppermost position, said power take-off belt tightener including a shaft journalled in said sleeve, an arm secured to said shaft and projecting radially outward therefrom, and a portion of said power take-off belt tightener being connected to said arm, means connected to said shaft for pivoting said shaft within said sleeve to move said belt tightener portion about said axis between tightened and loosened positions independently of the position of said pedal, means for selectively locking said tightened or loosened portion in the engaged or disengaged position, a first pivotally mounted brake shoe movable between a released position spaced from said first brake drum and an actuated position in engagement with said first brake drum, second connecting means resiliently connecting said first brake shoe to said first connecting means with said first brake means being in a released position when said pedal is in its uppermost position, a second pivotally mounted brake shoe movable between a released position spaced from said second brake drum and an actuated position in engagement with said first brake drum, third connecting means connecting said second brake shoe to said second connecting means with said second brake means being in a released position when said pedal is in its uppermost position, said connecting means being so arranged that initial downward movement of said pedal releases said drive belt tightener, further movement of said pedal engages said first brake shoe with said first brake drum and still further downward movement of said pedal engages said second brake shoe with said second brake drum.

5. In a tractor having a power train which includes an engine, a main drive shaft having a plurality of shiftable gears thereon, a drive belt normally engaging said engine with said main drive shaft, a belt tightener for tightening or loosening said belt, a worm shaft having a plurality of driven gears thereon, means for shifting a selected one of said shiftable gears into engagement with said predetermined one of said driven gears, ground engaging drive wheels, means connecting said drive wheels to said worm shaft, a power take-off shaft, a power take-off belt connecting said power take-off shaft to said engine, and a belt tightener for alternately tightening or loosening said power take-off belt, the improvement which comprises a brake including a brake drum secured to said worm shaft, a vertically movable pedal, first connecting means connecting said pedal to said drive belt tightener and including a sleeve journalled for rotation about a fixed axis, resilient means for normally holding said belt tightener in tightening position against said drive belt and for holding said pedal in its uppermost position, said power take-off belt tightener including a shaft journalled in said sleeve, an arm secured to said shaft and projecting radially outward therefrom, and an idler being freely journalled on said arm, means connected to said shaft for pivoting said shaft within said sleeve to move said idler about said axis between tightened and released positions independently of the position of said pedal, means for selectively locking said power take-off belt tightener in the tightened or loosened position, said brake further including a pivotally mounted brake shoe movable between a released position spaced from said brake drum and an actuated position in engagement with said brake drum, and second connecting means resiliently connecting said brake shoe to said first connecting means with said brake shoe being in a released position when said pedal is in its uppermost position, said connecting means being so arranged that partial depression of said pedal releases said drive belt tightener, further depression of said pedal transmits resilient pressure to said brake, and still further depression of said pedal transmits firm pressure to said brake.

6. In a tractor having a power train including an engine, a main drive shaft having a plurality of shiftable gears thereon, a drive belt connecting said engine to said drive shaft in driving relationship, a belt tightener adapted to tighten or loosen said belt, a worm shaft having a plurality of driven gears thereon, brake means on said worm shaft, means for shifting a selected one of said shiftable gears into engagement with a predetermined one of said driven gears, ground engaging drive wheels, and means connecting said drive wheels to said worm shaft; the improvement which comprises a support, a bell crank pivotally mounted on a support and connected to said belt tightener, a bar attached by the other end to the bell crank, a lock nut on one end of said bar, a pivot block slidably mounted on the bar, a shaft mounted for rotation about its longitudinal axis and connected to said block so that sliding of said block causes rotation of said shaft about its own axis, said shaft being connected also to said brake means, spring means on said bar between said pivot block and said lock nut, and actuating means connected to said bell crank and arranged to move sequentially to a first position in which said belt tightener releases the belt, a second position in which the brake means is applied by force resiliently transmitted from said actuating means through said spring in a partially compressed state, and finally to a fully actuated position in which said spring is compressed further and said brake means is applied by force firmly transmitted from said actuating means.

7. In a tractor having a set of steerable wheels and a set of driven wheels, and a power train which includes an engine, a main drive shaft and clutch means adapted to connect said engine with said main drive shaft when engaged and to disconnect said engine from said main drive shaft when disengaged, the improvement comprising a driven shaft having a worm gear operatively connected to said driven wheels, transmission means having a plurality of selectively engageable gears connecting said driven shaft with said main drive shaft, an actuating pedal operative to engage and disengage said clutch means, means biasing said pedal into a position wherein said clutch means is engaged, a brake operating rod mounted on said tractor for oscillation about its longitudinal axis, a brake disc mounted on said driven shaft, a brake shoe mounted on said rod and moveable into a position engaging said brake disc to stop said tractor, and means connected to said pedal and to said rod for oscillating said rod wherein movement of said pedal disengages said clutch means and oscillates said rod causing said brake shoe to contact said brake disc.

8. A tractor having a frame, a power train which includes an engine and a main drive shaft having a plurality of shiftable gears thereon, main clutch means normally connecting said engine with said main drive shaft, a worm shaft having a plurality of driven gears thereon, means for shifting a selected one of said shiftable gears into engagement with a predetermined one of said driven gears, ground engaging drive wheels, means connecting said drive wheels to said worm shaft, a power take-off shaft, and power take-off clutch means movable between an engaged position connecting said engine in driving engagement with said power take-off shaft and a disengaged position releasing said engine from said power take-off shaft; the improvement which comprises a longitudinal actuating shaft journalled on said frame, a pedal, linkage interconnecting said pedal, said actuating shaft and said main clutch means, a brake drum mounted on said worm shaft, a brake shoe fixed on said actuating shaft in a position for engaging said brake drum when said actuating shaft is pivoted about its longitudinal axis, said pedal being arranged to be moved to a fully actuated position wherein said main clutch means is disengaged and said brake shoe is engaged against the outer periphery of said brake drum to stop said worm shaft, and means for actuating said power take-off clutch means independently of said main clutch means.

9. In a tractor having a power train which includes an engine, a main drive shaft having a plurality of shiftable gears thereon, disengageable power transmission means for connecting said engine to said main drive shaft, said disengageable transmission means being movable from a normal position establishing a driving connection between said engine and said main drive shaft and a second position in which said driving connection is broken, a worm shaft having a plurality of driven gears thereon, means for shifting a selected one of said shiftable gears into engagement with a predetermined one of said driven gears, ground engaging drive wheels, and means connecting said drive wheels to said worm shaft; the improvement which comprises first brake means operatively connected to said main drive shaft, second brake means operatively connected to said worm shaft, and a single pedal connected to said transmission means and to both of said brake means and arranged upon being actuated to first move said transmission means away from normal driving position and thereafter activate said first brake means, and then activate said second brake means.

10. In a tractor having a power train which includes an engine, a main drive shaft having a plurality of shiftable gears thereon, disengageable power transmission means for connecting said engine to said main drive shaft, said disengageable transmission means being movable from a normal position establishing a driving connection between said engine and said main drive shaft and a second position in which said driving connection is broken, a worm shaft having a plurality of driven gears thereon, means for shifting a selected one of said shiftable gears into engagement with a predetermined one of said driven gears, ground engaging drive wheels, and means connecting said drive wheels to said worm shaft; the improvement which comprises a first brake element secured to said main drive shaft, a second brake element secured to said worm shaft, a first braking member mounted for movement into braking engagement with said first brake element, a second braking member mounted for movement into engagement with said second brake element, and movable means connected to both of said braking elements and to said transmission means and arranged upon movement away from a position corresponding to said normal driving position of said transmission means to first disengage said transmission means, to thereafter move said first braking member into braking engagement with said first brake element, and then to move said second braking member into braking engagement with said second brake element.

11. In a tractor having a power train which includes an engine, a main drive shaft having a plurality of shiftable gears thereon, disengageable power transmission means connecting said engine to said main drive shaft, said transmission means being movable from a normal position establishing a driving connection between said engine and said main drive shaft and a second position in which said driving connection is broken, a worm shaft having a plurality of driven gears thereon, means for shifting a selected one of said shiftable gears into engagement with a predetermined one of said driven gears, ground engaging drive wheels, and means connecting said drive wheels to said worm shaft; the improvement which comprises a first brake element secured to said main drive shaft, a second brake element secured to said worm shaft, a pivotally mounted pedal, first connecting means pivotally connecting said pedal to said power transmission means, resilient means for normally holding said transmission means in said normal position and for holding said pedal in its uppermost position, a first movably mounted braking member movable between a released position spaced from said first brake element and an actuated position in engagement with said first brake element, second connecting means for connecting said first braking member to said first connecting means with said first braking member being in a released position when said pedal is in its uppermost position, resilient means included in said second connecting means, a second movably mounted braking member movable between a released position spaced from said second brake element and an actuated position in engagement with said second brake element, third connecting means for connecting said second braking member to said second connecting means with said second braking member being in a released position when said pedal is in its uppermost position, and further resilient means included in said second connecting means, said connecting means being so arranged that initial downward movement of said pedal moves said transmission means away from said normal driving position, further movement of said pedal engages sad first braking member with said first brake element and still further downward movement of said pedal engages said second braking member with said second brake element.

References Cited by the Applicant
UNITED STATES PATENTS

| | | |
|---|---|---|
| 1,609,637 | 12/1926 | Wyman. |
| 1,654,924 | 1/1928 | Douglas. |
| 2,024,293 | 12/1935 | Keall et al. |
| 2,037,643 | 4/1936 | Voigt. |
| 2,252,861 | 8/1941 | Porsche. |
| 2,589,830 | 3/1952 | Lewin. |
| 2,891,642 | 6/1959 | Moore. |
| 3,108,481 | 10/1963 | Westmont. |

A. HARRY LEVY, *Primary Examiner.*